(12) United States Patent
Rogers et al.

(10) Patent No.: US 11,627,650 B2
(45) Date of Patent: Apr. 11, 2023

(54) INTELLIGENT SENSOR-ACTIVATED LIGHT CONTROL DEVICES, SYSTEMS, AND METHODS INCLUDING AMBIENT LIGHT SENSORS

(71) Applicant: EATON CORPORATION, Cleveland, OH (US)

(72) Inventors: Brandon Jeremy Rogers, Senoia, GA (US); Ahmed El-Gayyar, Senoia, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 803 days.

(21) Appl. No.: 15/088,375

(22) Filed: Apr. 1, 2016

(65) Prior Publication Data
US 2017/0290128 A1 Oct. 5, 2017

(51) Int. Cl.
| | |
|---|---|
| H05B 47/11 | (2020.01) |
| H05B 47/19 | (2020.01) |
| H05B 47/115 | (2020.01) |
| H05B 37/02 | (2006.01) |
| H05B 41/24 | (2006.01) |
| H05B 41/16 | (2006.01) |
| H05B 41/36 | (2006.01) |

(52) U.S. Cl.
CPC .......... *H05B 47/11* (2020.01); *H05B 47/115* (2020.01); *H05B 47/19* (2020.01); *Y02B 20/40* (2013.01)

(58) Field of Classification Search
CPC ............ H05B 37/0272; H05B 33/0854; H05B 37/0218; H05B 37/0254
USPC ........ 315/152, 159, 297, 308, 309, 318, 360
See application file for complete search history.

(56) References Cited

U.S. PATENT DOCUMENTS

| | | | |
|---|---|---|---|
| 2002/0154652 A1* | 10/2002 | Yoshimura | H05B 47/16 370/537 |
| 2006/0076908 A1* | 4/2006 | Morgan | H05B 47/10 315/312 |
| 2008/0265799 A1* | 10/2008 | Sibert | H05B 47/155 315/292 |
| 2012/0143357 A1* | 6/2012 | Chemel | G01D 18/00 702/128 |
| 2012/0235579 A1* | 9/2012 | Chemel | F21V 29/60 315/152 |
| 2015/0108901 A1* | 4/2015 | Greene | G08C 17/02 315/149 |

* cited by examiner

*Primary Examiner* — Wei (Victor) Y Chan
(74) *Attorney, Agent, or Firm* — Eckert Seamans Cherin & Mellott, LLC

(57) ABSTRACT

An intelligent sensor-activated light control device including at least one ambient light sensor is described herein. In one exemplary, non-limiting embodiment, the motion is detected via one or more motion sensors. An ambient light level is then determined using one or more ambient light sensors, and a light control device causes light to be output at an output light level associated with the determined ambient light level. In one embodiment, the output light level is further determined based on a current time interval during with which the motion is detected.

13 Claims, 3 Drawing Sheets

| T\A | 0.0–0.1 | 0.1–0.2 | 0.2–0.3 | 0.3–0.4 | 0.4–0.5 | 0.5–0.6 | 0.6–0.7 | 0.7–0.8 | 0.8–0.9 | 0.9–1.0 |
|---|---|---|---|---|---|---|---|---|---|---|
| 0–1 | 10% | 10% | -- | -- | -- | -- | -- | -- | -- | -- |
| 1–2 | 10% | -- | -- | -- | 50% | 55% | -- | -- | -- | -- |
| 2–3 | 15% | 25% | 35% | 50% | 55% | -- | -- | -- | 90% | -- |
| 3–4 | 15% | -- | -- | -- | -- | -- | -- | -- | -- | 100% |
| 4–5 | -- | 50% | 50% | 50% | 50% | 60% | 80% | 90% | 100% | 100% |
| 5–6 | 30% | 50% | 50% | 60% | 70% | 80% | 100% | 100% | 100% | 100% |
| 6–7 | 50% | 50% | 50% | 50% | 55% | 55% | 65% | 85% | 90% | 100% |
| 7–8 | 50% | -- | -- | 50% | 55% | -- | -- | 80% | -- | -- |
| 8–9 | 40% | 50% | -- | -- | -- | -- | -- | -- | -- | -- |
| 9–10 | 30% | 45% | -- | -- | -- | -- | -- | -- | -- | -- |

AMBIENT LIGHT LEVEL / TIME INTERVAL

| T\A | 0.0-0.1 | 0.1-0.2 | 0.2-0.3 | 0.3-0.4 | 0.4-0.5 | 0.5-0.6 | 0.6-0.7 | 0.7-0.8 | 0.8-0.9 | 0.9-1.0 |
|---|---|---|---|---|---|---|---|---|---|---|
| 0-1 | 10% | 10% | -- | -- | -- | -- | -- | -- | -- | -- |
| 1-2 | 10% | -- | -- | -- | 50% | 55% | -- | -- | -- | -- |
| 2-3 | 15% | 25% | 35% | 50% | 55% | -- | -- | -- | 90% | -- |
| 3-4 | 15% | -- | -- | -- | -- | -- | -- | -- | -- | 100% |
| 4-5 | -- | 50% | 50% | 50% | 50% | 60% | 80% | 90% | 100% | 100% |
| 5-6 | 30% | 50% | 50% | 60% | 70% | 80% | 100% | 100% | 100% | 100% |
| 6-7 | 50% | 50% | 50% | 50% | 55% | 55% | 65% | 85% | 90% | 100% |
| 7-8 | 50% | -- | -- | 50% | 55% | -- | -- | 80% | -- | -- |
| 8-9 | 40% | 50% | -- | -- | -- | -- | -- | -- | -- | -- |
| 9-10 | 30% | 45% | -- | -- | -- | -- | -- | -- | -- | -- |

INTELLIGENT SENSOR-ACTIVATED LIGHT CONTROL DEVICES, SYSTEMS, AND METHODS INCLUDING AMBIENT LIGHT SENSORS

BACKGROUND

Field

The disclosed concept relates generally to intelligent sensor-activated light control devices and systems including ambient light sensors, as well as methods employing intelligent sensor-activated light control devices including ambient light sensors.

Background Information

Light control devices, such as lamps, overhead lights, or any other wiring device coupled with or in communication with a light output device, that are coupled to sensors, turn on in response to the sensors being activated. For example, in response to detecting motion, a light may be turned on to a particular output light level. Typically, these light control devices are programmed such that each time the sensor is activated, the light control device will cause light to be output at a pre-set brightness level.

While individuals may adjust a level of brightness outputted by their sensor-activated light control device after light has been output, many times the level of brightness is unsatisfactory for the current ambient light levels of the room or setting where the lighting device is located. For example, during the daytime hours on a cloudy day, the ambient light level within a room may appear to be substantially similar to the ambient light levels of that same room during the evening hours. In this scenario, the lighting device will turn on in response to motion being detected at the same level of brightness as if it were a sunny day. This can strain an individual's eyes, and make for an overall poor user experience with their motion-activated light.

Ambient light levels within a room or other local environment where the sensor-activated light control device is located, for example, vary depending on a position within that particular room or local environment. For example, an ambient light sensor may detect a different ambient light level if placed on a wall facing a window as opposed to if the ambient light sensor was placed on a same wall as the window. Other factors, such as the number of windows in the room, doors, skylights, room color, outside light sources (e.g., street lights, decorations, etc.), and/or a position of the room with relation to the sun's arc through the sky, for example, all can contribute to a current ambient light level within a room.

Although an individual is able to manually adjust the light's output light levels, the adverse effects will still be felt each time the lighting device is activated and turns on at the undesired brightness levels. Furthermore, the individual will be forced to continually adjust the output lighting level each time their sensor-activated light control device turns on at the undesired brightness level.

There is, therefore, room for improvement for sensor-activated light control devices, systems, and methods.

SUMMARY

These needs and others are met by embodiments of the disclosed concept, which are directed to intelligent sensor-activated light control devices, systems, and methods including ambient light levels, and in particular, intelligent sensor-activated light control devices that are dynamically adaptable to user inputs, ambient light levels, and a time interval that activation of the sensor-activated light control device occurs.

As one aspect of the disclosed concept, a method is provided for dynamically adjusting output light levels. In one embodiment, an ambient light level within a local environment is determined using at least one ambient light sensor in response to motion being detected by at least one motion sensor. An output light level stored in memory that is associated with the ambient light level is also determined. A light control device then causes light to be output at the output light level in response to the motion being detected.

As another aspect of the disclosed concept, an intelligent sensor-activated light control device is provided. The intelligent sensor-activated light control device includes at least one motion sensor structured to detect motion within a local environment within which the at least one motion sensor is located. The intelligent sensor-activated light control device also includes at least one ambient light sensor structured to determine an ambient light level within the local environment in response to the motion being detected by the at least one motion sensor. The intelligent sensor-activated light control device further includes memory that stores a plurality of output light levels, a lighting device structured to output light, and at least one processor. The at least one processor is structured, in one embodiment, to determine an output light level from the plurality of output light levels stored in the memory that the lighting device is to output light at based, at least in part, on the ambient light level determined by the at least one ambient light sensor. The at least one processor is further structured to cause the lighting device to output light at the output light level.

As yet another aspect of the disclosed concept, an intelligent sensor-activated light control system is provided. The intelligent sensor-activated light control system includes at least one motion sensor positioned at a first location within a local environment, at least one ambient light sensor positioned at a second location within the local environment, and a lighting device positioned at a third location within the local environment. The intelligent sensor-activated light control system further includes a timer, memory that stores a plurality of output light levels, communications circuitry, and at least one processor. The at least one processor is structured, in one embodiment, to receive, using the communications circuitry, an ambient light level determined by the at least one ambient light sensor for the local environment in response to motion being detect by the at least one motion sensor. The at least one processor is also structured to determine, from the memory, an output light level from the plurality of output light levels for the lighting device to output light at, the output light level being associated with at least one of: the ambient light level and a time interval during which the motion was detected. The at least one processor is further structured to provide, using the communications circuitry, instructions to the lighting device to output light at the output light level that is determined.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
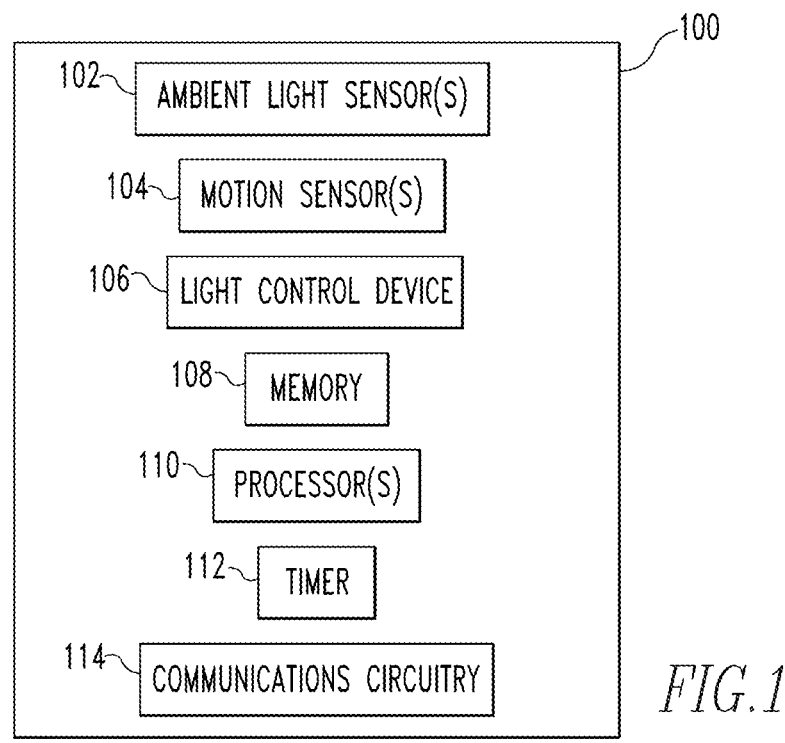
FIG. 1 is an illustrative block diagram of an intelligent sensor-activated light control device, in accordance with an embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein. As employed herein, the terms "light control device" and "light control system" refer to any known or suitable component or feature capable of causing light to be output in response to an activation or input to do so.

As employed herein, the term "N % ambient light," where N is any number, corresponds to a percentage of a maximum amount of ambient light. For example, "50% ambient light" would correspond to 50% of the maximum amount of ambient light.

As employed herein, the term "N % output light," where N is any number, corresponds to a percentage of a maximum amount of out light. For example, "50% output light" would correspond to 50% of the maximum amount of output light. As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the statement that two or more parts are "electrically coupled" or are in "electrical communication" shall mean that two or more the parts or components are joined together either directly or joined through one or more intermediate parts such that electricity, current, voltage, and/or energy is operable to flow from one part or component to the other part or component, and vice versa.

As employed herein, the terms "household," "residence," and/or "dwelling" refer to a structure where one or more individuals may live or work.

As employed herein, the terms "motion sensor" or "motion sensing device" shall mean any device capable of detecting motion within a local environment within which the device is located, and communicating the detection of the motion to one or more other devices or components.

As employed herein, the terms "ambient light sensor" or "ambient light sensing device" shall mean any device capable of determining an amount of ambient light present within a local environment within which the device is located, and communicating that amount of ambient light to one or more other devices or components.

FIG. 1 is an illustrative block diagram of an intelligent sensor-activated light control device 100, in accordance with an embodiment of the disclosed concept. Intelligent sensor-activated light control device 100, in one exemplary, non-limiting embodiment, includes an ambient light sensor 102, a motion sensor 104, a light control device 106, memory 108, a processor 110, a timer 112 or clock, and communications circuitry 114. In one embodiment, intelligent sensor-activated light control device 100 includes multiple instances of ambient light sensor 102, motion sensor 104, light control device 106, memory 106, processor 110, timer 112, and/or communications circuitry 114, however, for simplicity, only a single instance of each component is presented and described herein.

Ambient light sensor 102, in one embodiment, corresponds to any light sensor capable of detecting ambient light within a room or other local environment within which it is located. Ambient light sensor 102, in another exemplary embodiment, is further capable of measuring an amount of ambient light, or an ambient light level, within the room or other local environment where it is located. For example, ambient light sensor 102 may correspond to a photosensor or photodetecter capable of detecting incident photons, as well as determining an incoming rate, or flux, of photons. Various types of ambient light sensors include, but are not limited to, active-pixel sensors ("APSs"), bolometers, infrared detectors, light emitting diodes ("LEDs"), optical detectors, photoresisters, photovoltaic cells, photodiodes, photomultipliers, phototubes (e.g., cathode tubes), phototransistors, and/or semiconductor detectors. In one embodiment, ambient light sensor 102 is structured to detect incident light within the visible light spectrum (e.g., light having a wavelength between 400-700 nanometers). However, in another embodiment, ambient light sensor 102 is also capable of detecting incident light having wavelengths of the infrared range (e.g., light having a wavelength between 700 nanometers and 1 millimeter), microwave range (e.g., light having a wavelength between 1 millimeter and 1 meter), radio range (e.g., light having a wavelength between 1 millimeter and 100,000 kilometers), ultraviolet range (e.g., light having a wavelength between 10 nanometers and 380 nanometers), and x-ray range (e.g., light having a wavelength between 0.01 nanometer and 10 nanometer).

Motion sensor 104, in one embodiment, corresponds to any device capable of detecting motion within room or other local environment within which it is located. For example, motion sensors or motion detectors may detect changes in the electric, magnetic, electromagnetic, optical, microwave, and/or acoustic field within a certain proximity of the motion sensor. In response to a change being detected within the electric, magnetic, electromagnetic, optical, microwave, and/or acoustic field, a signal is generated that indicating that motion is present. Various types of motion sensors include, but are not limited to, passive infrared sensors ("PIRs"), Doppler radar sensors, ultrasonic sensors, image capturing devices, image processing sensors, video capturing devices or sensors, and/or tomographic motion sensors.

Light control device 106, in one embodiment, corresponds to any device capable of causing light to be output within room or other local environment within which it is located. For example, light control device 106 may include a wiring device, electrical wiring, and/or a light source. A wiring device, for example, may correspond to any suitable structure for controlling a light source, such as an in-wall mounted component, a dimmer, a light switch, etc. The electrical wiring, for instance, electrical couples the wiring device to the light source. For example, the electrical wiring may control an amount of current, voltage, and/or power provided to the light source, causing the light source to output light. Furthermore, various light sources include, but are not limited to, a light bulb, an overhead light, a photodiode, an LED or array of LEDs, or any other lighting device, or any combination thereof. Persons of ordinary skill in the art will recognize that light control device 106 may each of the wiring device, electrical wiring, and light source, and the aforementioned are merely exemplary.

Memory 108, in one embodiment, corresponds to one or more types of storage mediums such as any volatile or non-volatile memory, or any removable or non-removable memory implemented in any suitable manner to store data, such as ambient light levels, time intervals, and output light levels, for intelligent sensor-activated light control device 100. For example, information may be stored within memory 108 using computer-readable instructions, data structures, and/or program modules. Various types of memory include, but are not limited to, hard drives, solid state drives, flash memory, random access memory (e.g., "RAM"), permanent memory (e.g., ROM), electronically erasable programmable read-only memory ("EEPROM"), CD-ROM, DVD, magnetic cassettes, magnetic tapes, magnetic storage devices, RAID storage systems, or any other storage type, or any combination thereof. In one embodiment, memory 108 is implemented as computer-readable storage media ("CRSM"), which is accessible by processor 110 to execute one or more instructions store within memory 108.

Processor 110, in one embodiment, corresponds to any suitable processing circuitry capable of controlling operations and functionality of intelligent sensor-activated light control device 100, as well as facilitating communications between various components therein. Various types of processors 110 include, but are not limited to, central processing units ("CPUs"), graphic processing units ("GPUs"), microprocessors, digital signal processors, or any other type of processors, or any combination thereof. Persons of ordinary skill in the art will further recognize that one or more hardware logic components, firmware applications, media applications, and/or applications resident on device 100 may also be included within processor 110.

Timer 112, in one embodiment, corresponds to any temporal measurement device or component capable of measuring a time or time interval for intelligent sensor-activated light control device 100. For example, timer 112 may measure a time of day, such as that of a clock (e.g., 1:00 AM, 7:00 PM, etc.). As another example, timer 112 may measure a time interval or time intervals. In this particular scenario, a twenty-four (24) hour time period, corresponding to one day, is capable of being segmented into any suitable number of time intervals, and timer 112 monitors each time interval. In this way, various activities and readings, such as ambient light levels and/or output light levels during each time interval are stored within memory 108. As one particular example, timer 112 may be structured to measure activity during twenty-four (24) one-hour time intervals. For example, a first time interval (e.g., time interval 0-1) may correspond to a first hour during with which intelligent sensor-activated light control device 100 is operating, a second time interval (e.g., time interval 1-2) may correspond to a second hour during with which intelligent sensor-activated light control device 100 is operating, and so on. In one embodiment, timer 112 is also capable of monitoring and measuring activity during longer time periods or time intervals. For example, timer 112 may be structured to measure activity during sixty one-second time intervals (e.g., one minute), sixty one-minute time intervals (e.g., one hour), and/or seven twenty-four one-hour time intervals. Furthermore, timer 112 is capable of being structured to measure time intervals related to weeks, months, seasons, and/or years. Persons of ordinary skill in the art will recognize that the temporal breakdown of timer 112 is modifiable and adjustable, and any suitable breakdown may be employed.

Communications circuitry 114, in one embodiment, corresponds to any circuitry allowing or enabling intelligent sensor-activated light control device 100 to communicate with one or more additional devices, components, servers, networks, and/or systems. For example, communications circuitry 114 may enable one or more ambient light sensors 102 to communicate with lighting device 100. As another example, communications circuitry 114 may enable lighting device 100 to send instructions to an auxiliary lighting device to output light at a pre-set level stored within memory 108. Further still, communications circuitry 114, in one embodiment, is capable of enabling intelligent sensor-activated light control device 100 receive communications from an associated user device. For example, an adjustment to an output light level may be sent from an individual's mobile device to intelligent sensor-activated light control device 100 using communications circuitry 114 to receive the instructions to adjust the output light level. Communications circuitry 114 is structured to employ any number of communication protocols, such as, Transfer Control Protocol and Internet Protocol ("TCP/IP") (e.g., any of the protocols used in each of the TCP/IP layers), Hypertext Transfer Protocol ("HTTP"), wireless application protocol ("WAP"), Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-36/TDMA, iDen, LTE, or any other suitable cellular network protocol), infrared, BitTorrent, FTP, RTP, RTSP, SSH, and/or VOIP. Furthermore, communications circuitry 114 is structured to include one or more universal series bus ("USB") ports, or one or more Ethernet or broadband ports, and/or any other type of hardware access portion. In still another embodiment, communications circuitry 114 is configured to control power, current, voltage, or any other electrical signal, that is to be sent from intelligent sensor-activated light control device 100 to one or more additional devices or components located therein. For example, communications circuitry 114 may cause a varying amount of electrical power to be sent to a light to output a different amount of light than previously output.

Figure 2:
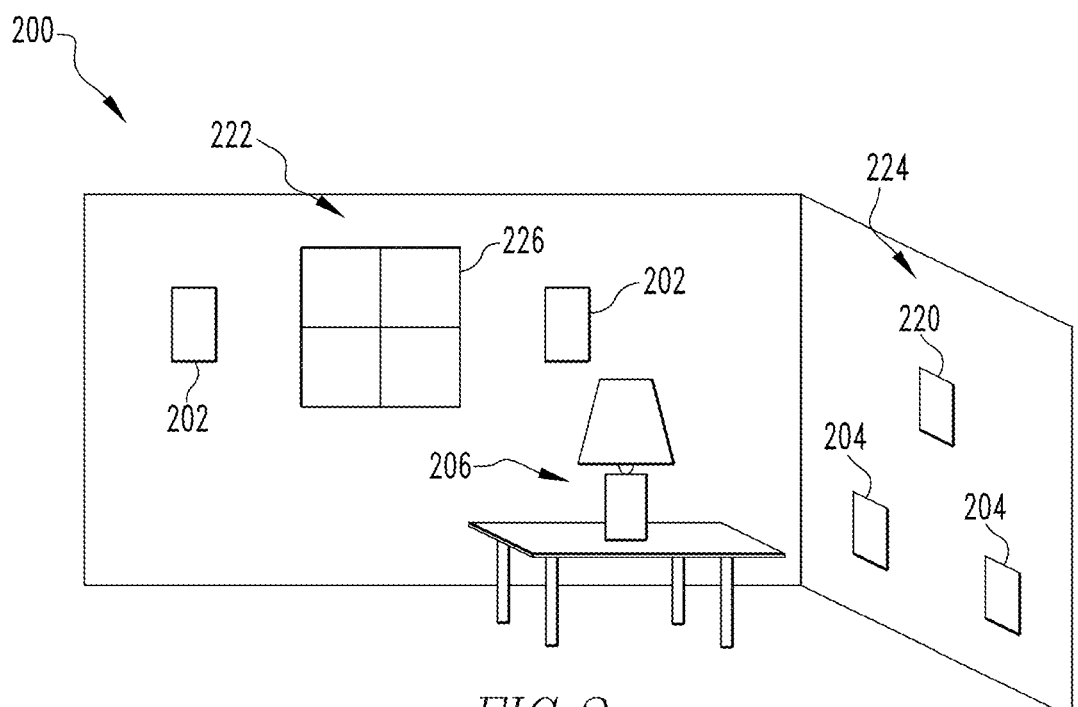
FIG. 2 is an illustrative schematic diagram of an intelligent sensor-activated light control system, in accordance with another embodiment of the disclosed concept.

FIG. 2 is an illustrative schematic diagram of an intelligent sensor-activated light control system 200, in accordance with another embodiment of the disclosed concept. Intelligent sensor-activated light control system 200, in the illustrative embodiment, includes one or more instances of an ambient light sensor 202, one or more instances of a motion sensor 204, and a light control device 206, located within a room or other local environment. In one embodiment, ambient light sensor(s) 202, motion sensor(s) 204, and light control device 206 are substantially similar to ambient light sensor 102, motion sensor 104, and light control device 106 of FIG. 1, and the previous descriptions apply.

In the illustrated embodiment, ambient light sensors 202 are located along a wall 222, which includes a window 226 thereon. The positioning of ambient light sensors 202 within a room affects an amount of ambient light detected by ambient light sensors 202. For example, placing ambient light sensors 202 along wall 222 adjacent to window 226 may causes ambient light sensors 202 to detect less ambient light than if they were placed along a wall 224, or another wall located opposite wall 222 including window 226. Furthermore, a height (e.g., a distance from the ground or floor) that ambient light sensors 202 are positioned also affects the ambient light levels detected by ambient light sensors 202.

Motion sensors 204 are, in the exemplary embodiment, located along wall 224. The positioning of motion sensors 204, in one embodiment, is dependent on a distance with which motion sensors 204 are capable of detecting motion within. For example, motion sensors 204 may be capable of detecting any motion within ten square meters, or any other suitable distance. In one embodiment, a configuration of motion sensors 204 within a room or local environment is such that motion sensors 204 are capable of detecting motion within as large an area within the room within which they are located. For example, motion sensors 204 may be positioned proximate a door for the room within which motion sensors 204 are located so that, if an individual enters the room, that motion is detected by motion sensors 204.

Light control device 206, in the illustrative, non-limiting embodiment, is located at a central position within a room. Light control device 206, in one embodiment, is substantially similar to light control device 106, and the previous description may apply. For example, light control device 206 may correspond to a lamp located on a table within the room. As another example, light control device 206 may correspond to an overhead light located on a ceiling of the room. Persons of ordinary skill in the art will recognize that the positioning of light control device 206 may vary depending on an individual's preferences, and the aforementioned is merely exemplary.

In one exemplary embodiment, each of ambient light sensors 202, motion sensors 204, and light control device 206 include a communications component (e.g., communications circuitry 114 of FIG. 1). Thus, each of ambient light sensors 202, motion sensors 204, and light control device 206 is capable of communicating with a central lighting device 220. For example, ambient light sensors 202, motion sensors 204, and/or light control device 206 may communicate with one another and/or central light control device 220 using a local network. In one non-limiting embodiment, one or more of ambient light sensors 202, motion sensors 204, and/or light control device 206 is a "smart" device, capable of communicating with an individual's user device, and receiving instructions (e.g., turn on, turn off), therefrom. In this particular scenario, the individual's user device is capable of providing instructions to central light control device 220, which relays the instructions to the appropriate component using communications circuitry 114. As another example, the individual's user device may, alternatively, communicate with one or more of ambient light sensors 202, motion sensors 204, and/or light control device 206 directly using communications circuitry, such as communications circuitry 114, located thereon.

Central light control device 220, in one embodiment, is substantially similar to intelligent sensor-activated light control device 100 of FIG. 1, with the exception that central light control device 220 communicates with external ambient light sensors 202, motion sensors 204, and light control device 206. For example, in response to detecting motion with a room, motion sensors 204 may send a communication to central light control device 220, which is received by communications circuitry (e.g., communications circuitry 114) resident thereon. After receiving the communication regarding motion being detected, central light control device 220 is structured to obtain an ambient light level within the room from ambient light sensors 202. For example, central light control device 220 may send a request communication to ambient light sensors 202, and may receive a communication back indicating a current ambient light level. In one embodiment, a digital signal is sent to a light source of light control device 206 to cause light to be output at a particular output light level. The output light level is retrieved from memory (e.g., memory 108) based, at least in part, on the ambient light level. In one embodiment, central light control device 220 sends a communication to light control device 206 to cause light to be output at the particular output light level associated with the current ambient light level. In another embodiment, central light control device 220 further includes a timer, such as timer 112 of FIG. 1, and is capable of determining an output light level for light control device 206 to output light at based on the ambient light level and a current time interval determined by the timer.

Figure 3:
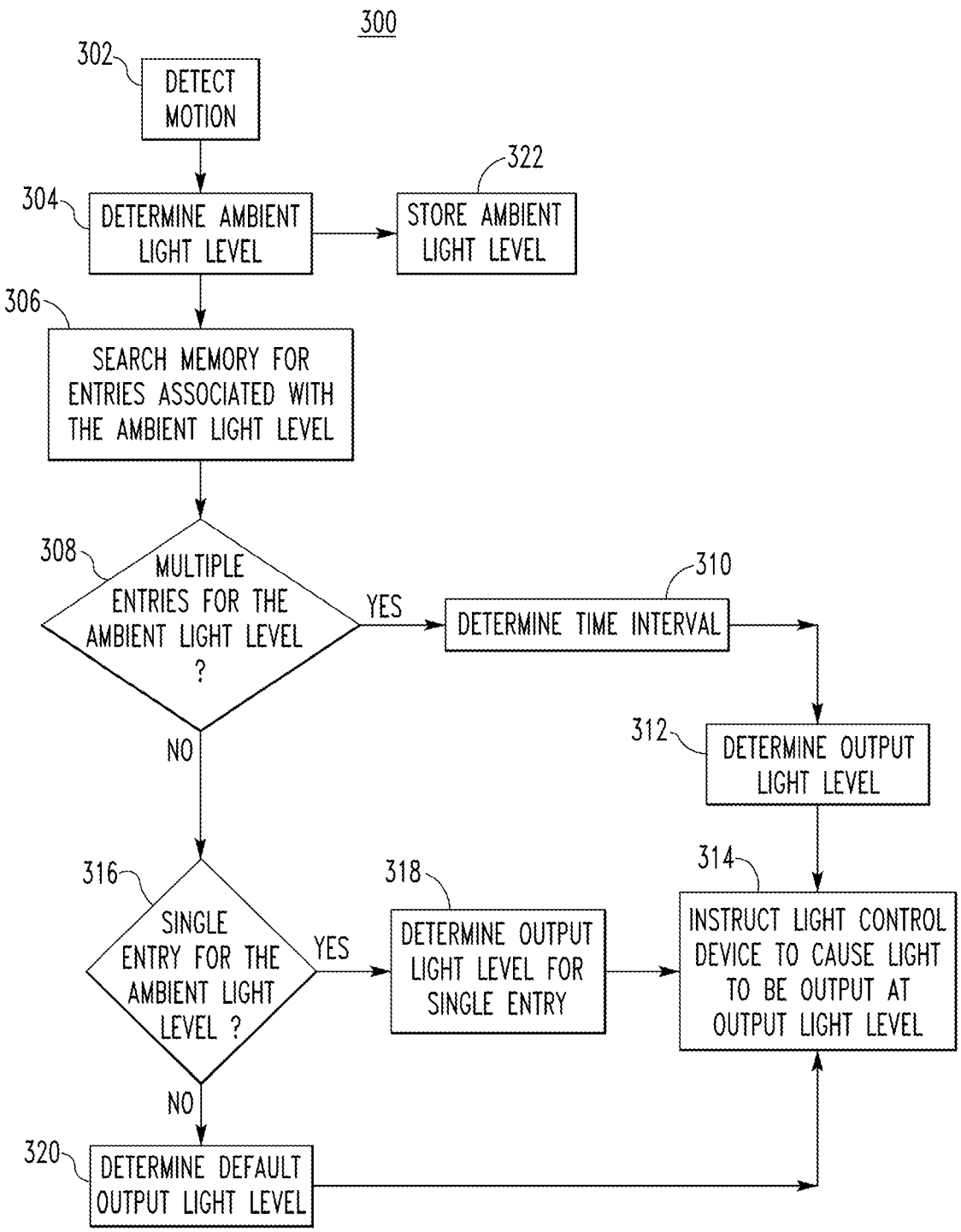
FIG. 3 is an illustrative flowchart of a process for causing light to be output at a particular output light level based on pre-set ambient light levels and known time intervals, in accordance with an embodiment of the disclosed concept.

FIG. 3 is an illustrative flowchart of a process 300 for causing a lighting device to output light at a particular output light level based on pre-set ambient light levels and known time intervals, in accordance with an embodiment of the disclosed concept. Process 300, in the exemplary, non-limiting embodiment, begins at step 302. At step 302, motion is detected within a local environment (e.g., a room) by one or more motion sensors, such as motion sensors 104. In response to motion being detected by the motion sensors, a digital signal, for example, may be generated by the motion sensor(s), which is communicated to processor 110 of intelligent sensor-activated light control device 100. The signal that is provided indicates to processor 110 that motion within the local environment has been detected, and therefore processor 110 is capable of proceeding with one or more subsequent actions. As another example, motion sensors 204, located along wall 222, may detect motion and, in response, generate a signal that is provided to central light control device 220 to indicate that motion within the local environment has been detected. In this particular scenario, motion sensors 204 are structured to communicate the signal indicating that motion has been detected to central light control device 220 using communications circuitry (e.g., communications circuitry 114).

At step 304, an ambient light level within the local environment is determined using one or more ambient light sensors, such as ambient light sensors 102 prior to light being output. In one embodiment, in response to receiving the signal that motion sensors 104 have detected motion, processor 110 instructs ambient light sensors 102 to determine an ambient light level currently present within the local environment, and provide the current ambient light level to processor 110. For example, in response to detecting motion within a room, ambient light sensor 104 may determine that the ambient light level within the room currently is at 50% ambient light. Thus, ambient light sensors 102 are structured to provide processor 110 (or any other component of intelligent sensor-activated light control device 100) a signal or other communication that indicates that the current ambient light level is 50% ambient light. As another example, in response to central lighting device 220 receiving an indication that motion sensors 204 have detected motion, central lighting device 220 may provide a communication to ambient light sensors 202 to determine a current ambient light level within their local environment. Ambient light sensors 202, therefore, obtain a reading or measurement of a current amount of ambient light present within the local environment (e.g., room), and provide a return communication to central lighting device 220 indicating the determined ambient light level. In one embodiment, a maximum amount of ambient light may be determined based on a location of ambient light sensor(s) 102 within a local environment.

However, this may occur prior to installation and/or operation of intelligent sensor-activated light control device 100.

In one embodiment, the current ambient light level is stored in memory 108 after being determined by ambient light sensor(s) 102 at step 322. For example, the current ambient light level may be cached for analysis or storage. As another example, the current ambient light level may be used an input condition to retrieve an output light level that is associated with the current ambient light level. In this way, light control device will output light at the appropriate output light level based on the current ambient light level. In one embodiment, ambient light sensors 102 continually monitor the ambient light level such that the current ambient light level within a room is continually ascertained and/or stored by intelligent sensor-activated light control device 100. For example, ambient light sensor 102 may determine a current ambient level within a room where it is located, and may continually repeat this determination every few seconds, few minutes, few hours, etc. This enables ambient light sensor 102 to continually analyze the ambient light levels within the room. In this particular scenario, in response to motion being detected at step 302, processor(s) 110 of intelligent sensor-activated light control device 100 are structured to retrieve a most recently cached or stored ambient light level, and that ambient light level is used as the current ambient light level prior to light control device 106 causing any light to be output. However, persons of ordinary skill in the art will recognize that the aforementioned is merely exemplary.

At step 306, intelligent sensor-activated light control device 100 performs a search within memory 108 for output light level entries that are associated with the ambient light level that was determined by ambient light sensor(s) 102 at step 304. For example, in response to determining the ambient light level within a room, intelligent sensor-activated light control device 100 may search through memory 108 to determine if there are any output light levels associated with the ambient light level that was determined. Each time motion is detected by motion sensor(s) 104, light control device of intelligent sensor-activated light control device 100 outputs light at a certain output light level. The particular amount of output light is dependent, in one embodiment, on a current ambient light level. For example, if the ambient light level within a room is high (e.g., 90% ambient light), then the output light level may be low (e.g., 30% output light), whereas if the ambient light level within the room is low (e.g., 20% ambient light), then the output light level may be high (e.g., 70% ambient light). However, the ambient light level within a particular room is capable of being substantially similar at different times depending on a variety of conditions (e.g., position of the sun with respect to ambient light sensor 102). Thus, at step 306, intelligent sensor-activated light control device 100 searches through memory 108 to determine which, if any, output light level entries are associated with the current ambient light level that was determined. For example, for an ambient light level of 50%, there may be multiple output light level entries that are associated, a single output light level entry that is associated, or no output light level entries that are associated. Furthermore, in one embodiment, instead of determining the ambient light level at step 304, in response to detecting motion at step 302, a most recent ambient light reading is obtained from ambient light sensor 102, and this value is used at step 306.

At step 308, a determination is made as to whether there are multiple output light level entries stored within memory 108 that are associated with the ambient light level that was previously determined (e.g., at step 304). If, at step 308, it is determined that there are multiple output light level entries stored in memory 108 for the ambient light level that was determined, process 300 proceeds to step 310, where a current time interval is determined. For example, memory 108 may have output light level entries of 70% output light, 50% output light, and 20% output light stored therein that are all associated with an ambient light level of 50% ambient light. However, each of the aforementioned output light levels, in one embodiment, is further associated with a different time interval.

The time interval, in one embodiment, corresponds to any suitable temporal breakdown within which data is categorized. For example, there may be twenty-four one-hour time intervals within a day. In this scenario, data corresponding to ambient light levels and output light levels are stored within memory 108 for each one-hour time interval. For instance, at an ambient light level of 50% occurring during time interval 12:00-13:00, the stored output light level is 20% output light.

In one embodiment, the time intervals are correlated with a clock. For example, time interval 0:00-1:00 may be associated with a time 0:00-1:00 o'clock, time interval 1:00-2:00 may be associated with a time 1:00-2:00 o'clock, and so on. In this particular scenario, an individual may program each time interval such that it is associated with their current time zone, or time preference (e.g., Eastern Standard Time, Pacific Standard Time, etc.).

In another embodiment, the time intervals are not correlated with a clock, but rather with an internal time (e.g., using timer 112) of intelligent sensor-activated light control device 100. For example, at an initial time intelligent sensor-activated light control device 100 is turned on, and timer 112 also begins timing. Thus, the time that timer 112 begins timing would correspond to time 0:00. The time intervals would, therefore, be measured with respect to time 0:00, such that a time interval 0:00-1:00 corresponds to a first hour from when intelligent sensor-activated light control device 100 is turned on. In this particular scenario, timer 112 would define each one-hour time interval over the course of a twenty-four hour time span. Thus, current ambient light levels and output light levels are, therefore, stored as being associated with a particular time interval during with which they were measured. Persons of ordinary skill in the art will recognize that although the aforementioned examples correspond to twenty-four hour time spans, any suitable time span may be employed by intelligent sensor-activated light control device 100, such as seconds, minutes, hours, days, weeks, months, and/or years, and the aforementioned is merely exemplary.

Using the current ambient light level that was determined and the current time interval, an output light level associated with the current ambient light level and the current time interval is determined at step 312. As an illustrative example, the current ambient light level determined by ambient light sensor(s) 102 may be 50% ambient light. For a 50% ambient light level, there may be three different entries of output light levels stored within memory 108 that are associated with that ambient light level; one entry during a first time interval, one entry during a second time interval, and one entry during a third time interval. If the current time interval, determined by timer 112, is the second time interval, then sensor-activated light control device 100 selects the output light level associated with the entry during the second time interval. For instance, for an ambient light level of 50% occurring during a time interval 5:00-6:00, the output light level entry stored within memory 108 corresponds to an output light level of 70% output light.

In one embodiment, the time intervals are segmented into as small a unit as necessary to be correlate a current time with the appropriate time interval. For example, during the time interval 5:00-6:00, there may be two different output light levels stored within memory 108 that are both associated with an ambient light level of 50% ambient light. For instance, an output light level of 100% output light is associated with 50% ambient light during a sub-time interval 5:00-5:30, whereas an output light level of 70% is also associated with 50% ambient light, however during a sub-time interval 5:31-6:00. Thus, if the current time is determined to be 5:15, the output light level of 100% is selected because this time falls within the sub-time interval 5:00-5:30. The time intervals, in one embodiment, therefore are capable of being divided into as many suitable sub-time intervals as necessary, and persons of ordinary skill in the art will recognize that the aforementioned example is merely illustrative.

The amount of output light is also dependent, in another embodiment, on a current time interval during which the motion was detected. Memory 108, in the exemplary embodiment, is also structured to store output light levels that are associated with a particular time interval during which the motion was detected. Memory 108, in an exemplary embodiment, is structured to store ambient light levels and/or average ambient light levels over the course of twenty-four one-hour time intervals corresponding to one day. For example, during a time interval 1:00-2:00, if a current ambient level is 50% ambient light, the output light level is to be 60% output. As another example, memory 108 may store ambient light levels over the course of a week, a month, or a year.

At step 314, the output light level that was determined for the current time interval and current ambient light level is provided to light control device 106 of intelligent sensor-activated light control device 100, which instructs light control device 106 to cause light to be light at the output light level that is selected. Continuing the previous example, during the interval 5:00-5:30 and for the ambient light level of 50%, the stored output light level associated with those conditions is 100% output light. Thus, light control device 106 causes light to be output at a 100% output light level.

In one embodiment, central light control device 220 provides a communication to light control device 206 to output light at the determined output light level from step 312. For example, in response to determining the appropriate output light level based on the current ambient light level, as well as potentially a current time interval, during which the motion was detected, processor 110 located for central light control device 220 sends a communication to light control device 206 (e.g., using communications circuitry 114), to output light at a particular output light level. In response to receiving the communication to output light at the particular output light level, light control device 206 is structured to output light at the prescribed output light level.

If, at step 308, it is determined that for a current ambient light level that was determined, there are not multiple output light level entries stored within memory 108 that are associated with the current ambient light level, then process 300 proceeds to step 316. At step 316, another determination is made as to whether or not there is a single output light level entry stored within memory 108 for the current ambient light level that was determined. If, at step 316, it is determined that there is only one output light level entry that is associated with the ambient light level determined at step 304, then process 300 proceeds to step 318. At step 318, the output light level corresponding to the ambient light level is determined. For example, for an ambient light level of 50% ambient light, memory 108 may have a single output light level entry stored therein, which indicates, for that particular ambient light level, the associated output light level is 90% output light. After the output light level is determined at step 318, process 300 proceeds to step 314, where light control device 106 is instructed to output light at the determined output light level for the single entry associated with the determined ambient light level.

If, however, at step 316, it is determined that there are no entries stored within memory 108 that are associated with the ambient light level that was determined at step 304, a default output light level is determined at step 320. In one embodiment, if no output light level is stored for a certain ambient light level, then intelligent sensor-activated light control device 100 instructs light control device to output light at a maximum level (e.g., 100% output light). In another embodiment, if no output light level is stored for a certain ambient light level, then intelligent sensor-activated light control device 100 instructs light control device to output light at a minimum level (e.g., 0% output light). In one, non-limiting embodiment, sensor-activated light control device 100 then monitors any inputs provided thereto to determine an adjusted output light level for that particular ambient light level and/or time interval, and stores that output light level within memory 108.

Figures 4, 5:
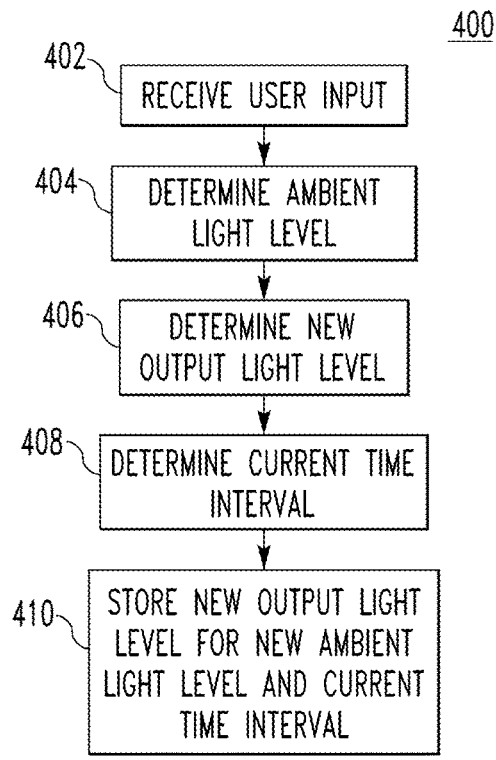
FIG. 4 is an illustrative flowchart of a process for updating an output light level for a particular ambient light level and time interval in response to a user input, in accordance with an embodiment of the disclosed concept.
FIG. 5 is an illustrative diagram of an exemplary table of output light levels based on various ambient light levels and time intervals, in accordance with an embodiment of the disclosed concept.

FIG. 4 is an illustrative flowchart of a process 400 for updating an output light level for a particular ambient light level and time interval in response to a user input, in accordance with an embodiment of the disclosed concept. Process 400, in one embodiment, is used in conjunction with process 300 of FIG. 3. For example, in response to light control device 106 causing light to be output at a certain output light level (e.g., step 314), process 300 may proceed to step 402 of process 400. However, in another embodiment, process 400 is used without one or more of steps 302-318 of process 300 being employed.

Process 400, in one embodiment, begins at step 402. At step 402, a user input is detected by intelligent sensor-activated light control device 100, and the user input is then provided to processor 110 thereon. The user input corresponds to any suitable input, such as an adjustment to a current output light level provided by light control device 106. As an illustrative example, an output light level is provided by light control device 106 in response to determining that a current ambient light level associated therewith. However, an individual may determine that the output light level for that particular ambient light level is not satisfactory and, therefore, adjusts the output light level provided by light control device 106. This adjustment, for instance, would correspond to the user input received by intelligent sensor-activated light control device 100.

In one illustrative embodiment, the user input is received by central light control device 220. For example, an individual adjust the output light level by modifying the output light level directly on central light control device 220, thereby modifying the instructions sent to light control device 206 regarding the amount of light caused to be output. As another example, an individual may adjust the output light level directly using light control device 206. In this particular scenario, light control device 206 may communicate the adjustment to the output light level to central light device 220, so that the new output light level may be stored within memory (e.g., memory 108) thereon. As still yet another example, an individual may adjust the output light level remotely, using an associated user device. In this particular scenario, the instructions to adjust the output light level may be sent either to light control device 206 or central light control device 220.

At step 404, an ambient light level for the room or other local environment where ambient light sensor 102 is located is determined. In one embodiment, the ambient light level is determined in response to motion being detected. In another embodiment, the ambient light level is continually monitored. In still another embodiment, the ambient light level is determined in response to the user input being received.

At step 406, a new output light level is determined based on the user input received. In one embodiment, the adjustment from the stored output light level associated with the current ambient light level to the new output light level is determined. For example, the output light level initially may have been 70% output light for an ambient light level of 50% ambient light. However, an individual within the room where the output lighting device (e.g., light control device 206) is located may determine that this output level is to low, and therefore manually raises the output light level to 90% output light. For instance, this raising of the output light level may be detected by intelligent sensor-activated light control device 100 or central light control device 220. Thus, the change of the output light level from 70% output light to 90% output light for ambient light level 50% ambient light is determined at step 404.

At step 408, a current time interval is determined corresponding to a time when the user input is received. In one embodiment, in response to determining that a user input is received, corresponding to an adjustment to the output light level, a current time for when the adjustment occurred is determined using a timer (e.g., timer 112) of intelligent sensor-activated light control device 100 or central light control device 220. For example, the adjustment to the output light level may be determined to have occurred during time interval 11:00-12:00. In one embodiment, however, the current time interval is substantially similar to a time interval associated with the originally output light level (and/or the previous ambient light level). Thus, step 408, in one embodiment, is optional as well. For example, the current time interval may correspond to a substantially similar time interval during which the motion that triggered light control device 206 to cause light to be output was detected. In this particular scenario, the current time interval during with which the user input was received is also the time interval during with which the motion was detected, however persons of ordinary skill in the art will recognize that this is merely exemplary.

At step 410, the new output light level corresponding to the ambient light level and the new current time interval (and/or the old time interval) are stored within memory 108. As mentioned previously, memory 108 stores entries of output light levels associated with one or more ambient light levels, as well as with different time intervals. Thus, in one embodiment, the new output light level is stored within memory 108 for the ambient light level, or for the ambient light level and the current time interval. As an illustrative example, for an ambient light level of 20% ambient light, there may be a single output light level associated therewith of 90% output light. In this scenario, an adjustment of the output light level from 90% output light to 70% output light may occur, and the new output light level of 70% output light is, therefore, stored with the ambient light level of 20% ambient light. This way, if an ambient light level of 20% ambient light is determined to be present at a later time, and motion is detected, intelligent sensor-activated light control device 100 will cause light control device to output light at the 70% output light level. Furthermore, using the aforementioned example, a time interval for when the adjustment to the output light level occurs is also stored with the new output light level for the particular ambient light level. Thus, if motion is detected during a similar time interval and ambient light level, the new output light level will be used.

In one embodiment, the new output light level determined at step 404 is stored within memory 108 prior to the ambient light level and/or current time interval being determined. Thus, the new output light level is updated for a particular ambient light level previously determined (e.g., at step 304). In this way, the previous ambient light level's associated output light level is updated within memory 108, without any new ambient light levels or time intervals being determined. However, persons of ordinary skill in the art will recognize that this is merely exemplary.

FIG. 5 is an illustrative diagram of an exemplary table 500 of output light levels based on various ambient light levels and time intervals, in accordance with an embodiment of the disclosed concept. Table 500, in the illustrative, non-limiting embodiment, corresponds to a table that lists a particular output light level for various time intervals and ambient light levels. In one embodiment, table 500 corresponds to output light levels stored within memory 108. In one exemplary embodiment, each column within table 500 corresponds to a different ambient light level, while each row corresponds to a different time interval. For example, a column 502 may correspond to an ambient light level ranging between 20% ambient light and 30% ambient light, and a row 504 may correspond to a time interval, such as time interval 6:00-7:00. Persons of ordinary skill in the art will recognize that time intervals listed within table 500 may correspond to times (e.g., row 504 corresponds to any time between 6:00 o'clock and 7:00 o'clock), or internal time intervals relative to an initial start time for timer 112 (e.g., time 0:00 being a time that timer 112 begin tracking time).

Each entry within table 500 corresponds to a different output light level. The particular entry that is to be used is based, therefore, in the exemplary embodiment, on the ambient light level that is determined, as well as the time interval during which motion is detected by motion sensors 104 or 204. In one exemplary embodiment, if motion is detected at a time 6:30 for an ambient light level of 25% ambient light, the output light level is signified by an entry 506, corresponding to an output light level of 50% output light. This is because the ambient light level, 25% ambient light, is between the values of 20% ambient light and 30% ambient light associated with column 502, and the time, 6:30, is between times 6:00 and 7:00 corresponding to a time interval 6:00-7:00, represented by row 504. Thus, at the intersection of column 502 and row 504, corresponding to entry 506, the output light level stored within table 500 is 50% output light.

In one embodiment, the various entries of table 500 are determined over time. For example, for an entry 508 within table 500, corresponding motion being detected during time interval 1:00-2:00, with an ambient light level ranging between 20% ambient light and 30%, no specified output light level is stored. Therefore, if motion is detected by motion sensor(s) 104 during that time interval for that ambient light level, light control device will initially output light at a default output light level (e.g., 50%, 100%, etc.). If no adjustment to the output light level is detected by intelligent sensor-activated light control device 100 or central light control device 220, then in one embodiment, the default output light level is stored as the output light level for those particular input conditions (e.g., motion detected during time interval 1:00-2:00 for an ambient light level between 20-30% ambient light). However, if an adjustment to the output light level is detected by intelligent sensor-activated light control device 100 or central light control device 220, then the output light level stored for entry 508 is stored as being the adjusted output light level. In this way, each entry within table 500 is eventually programmed to be at a desired output light level based on a user input and/or lack thereof such that whenever motion is detected by motion sensor(s) 104, light control device or 206 causes light to be output at a user preferred output light level.

In one embodiment, an entry, such as entry 506, within table 500 is rewritten to have a new output light level in response to a user adjustment. As an illustrative example, in response to motion sensor(s) 104 detecting motion, a current ambient light level may be determined to be 25% ambient light, and a current time interval may be determined to be the time interval 6:00-7:00. In this scenario, corresponding to entry 506, light control device 106 is instructed to output light at an output light level of 50% output light, as 50% output light is the stored output light level corresponding to the aforementioned ambient light level and time interval. However, an individual may decide that this output light level is to low, or to high, and may adjust the output light level to a different preferred output light level. Thus, in the exemplary embodiment, the newly adjusted output light level is then stored within table 500 for the current ambient light level and time interval. Continuing the illustrative example mentioned above, an individual may adjust the output light level from 50% output light to 75% output light. Therefore, entry 506 will be rewritten such that for motioned detected during time interval 6:00-7:00 with 25% ambient light, the output light level will now be 75% output light, as opposed to 50% output light.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method for dynamically adjusting output light levels, the method comprising:
    determining, in response to motion being detected by at least one motion sensor during a first time interval, an ambient light level within a local environment has a first value, wherein the ambient light level is determined using at least one ambient light sensor;
    determining a first output light level and a second output light level stored within memory, wherein the first and second output light levels are associated with the first value of the ambient light level, and wherein the first output light level is associated with the first time interval and the second output light level is associated with a second time interval;
    selecting the first output light level in response to motion being detected during the first time interval and determining that the ambient light level has the first value;
    causing, using a light control device, light to be output at the selected first output light level;
    determining, in response to motion being detected during the second time interval, that the ambient light level has the first value;
    selecting the second output light level in response to motion being detected during the second time interval and determining that the ambient light level has the first value; and
    causing light to be output at the selected second output light level,
    wherein the first output light level is different than the second output light level.

2. The method of claim 1, further comprising:
    receiving a user input to adjust the first output light level such that the light control device causes light to be output at a third output light level; and
    storing, in memory, the third output light level as being associated with the ambient light level.

3. The method of claim 2, wherein storing further comprises:
    determining that receiving the user input occurred within a third time interval; and
    storing the third output light level to also be associated with the third time interval.

4. The method of claim 1, wherein:
    the at least one ambient light sensor comprises a plurality of ambient light sensors; and
    each ambient light sensor of the plurality of ambient light sensors is located at a different position within the local environment.

5. An intelligent sensor-activated light control device, comprising:
    at least one motion sensor structured to detect motion within a local environment within which the at least one motion sensor is located;
    at least one ambient light sensor structured to determine an ambient light level within the local environment in response to the motion being detected by the at least one motion sensor;
    a memory that stores a first output light level that is associated with a first time interval, and a second output light level that is associated with a second time interval, wherein the first and second output light levels are each associated with a first value of the ambient light level;
    a timer;
    a light control device structured to cause light to be output; and
    at least one processor structured to:
        determine, using the timer, that the motion was detected during the first time interval;
        determine, in response to motion being detected during the first time interval, that the ambient light level has the first value;
        select the first output light level in response to determining the that the ambient light level has the first value and determining that the motion was detected during the first time interval;
        cause, using the light control device, light to be output at the selected first output light level;
        determine, in response to motion being detected during the second time interval, that the ambient light level has the first value;
        select the second output light level in response to determining that the ambient light level has the first value and determining that the motion was detected during the second time interval; and
        cause light to be output at the selected second output light level, wherein the first output light level is different than the second output light level.

6. The intelligent sensor-activated light control device of claim 5, further comprising:
an input mechanism structured to detect an adjustment to the first output light level.

7. The intelligent sensor-activated light control device of claim 6, wherein the at least one processor is further structured to:
determine a third output light level for the light control device to cause light to be output at based on the adjustment;
cause, using the light control device, light to be output at the third output light level; and
store, in the memory, the third output light level as being associated with the ambient light level.

8. The intelligent sensor-activated light control device of claim 7, wherein the at least one processor is further structured to:
store, in the memory, the third output light level as also being associated with a time interval during which the adjustment is detected.

9. The intelligent sensor-activated light control device of claim 5, wherein the output light level corresponds to a default output light level, the at least one processor is further structured to:
determine a new output light level to be stored within memory as being associated with the ambient light level.

10. An intelligent sensor-activated light control system, comprising:
at least one motion sensor positioned at a first location within a local environment;
at least one ambient light sensor positioned at a second location within the local environment and structured to determine an ambient light level within the local environment;
a light control device positioned at a third location within the local environment;
a timer;
a memory that stores a plurality of output light levels and a plurality of ambient light levels;
communications circuitry; and
at least one processor structured to:
determine, from the memory, a first output light level that is associated with a first time interval, and a second output light level that is associated with a second time interval, wherein the first and second output light levels are associated with the first value of the ambient light level;
determine, in response to a first instance of motion being detected, that the ambient light level has a first value;
determine, using the timer, that the first instance of motion was detected during the first time interval;
select, from the memory, the first output light level in response to determining that the ambient light level has the first value and determining that the first instance of motion was detected during the first time interval;
provide, using the communications circuitry during the first time interval, first instructions to the lighting device to output light at the selected first output light level,
determine, in response to a second instance of motion being detected, that the ambient light level has the first value;
determine, using the timer, that the second instance of motion was detected during the second time interval;
select, from the memory, the second output light level in response to determining that the ambient light level has the first value and determining that the second instance of motion was detected during the second time interval; and
provide, using the communications circuitry during the second time interval, second instructions to the lighting device to output light at the selected second output light level,
wherein the first output light level is different than the second output light level.

11. The intelligent sensor-activated light control system of claim 10, wherein the at least one processor is further structured to:
receive, using the communications circuitry, an indication that motion was detected by the at least one motion sensor.

12. The method of claim 1, wherein each of the first and second output light levels corresponds to a one hour time interval within a twenty-four hour clock.

13. The method of claim 1, wherein each time interval is measured in at least one of:
seconds;
minutes;
hours;
days;
weeks;
months; and
years.

* * * * *